United States Patent [19]

Bart

[11] Patent Number: 5,286,084
[45] Date of Patent: Feb. 15, 1994

[54] VEHICLE SEAT ASSEMBLY WITH INTEGRAL CHILD SEAT

[75] Inventor: Kurt A. Bart, Clinton Twp., Mount Clemens County, Mich.

[73] Assignee: Hoover Universal, Inc., Plymouth, Mich.

[21] Appl. No.: 982,762

[22] Filed: Nov. 27, 1992

[51] Int. Cl.⁵ ............................................. A47C 15/00
[52] U.S. Cl. ................................. 297/238; 297/378.1; 297/474; 297/194; 297/191
[58] Field of Search ............... 297/238, 234, 235, 191, 297/194, 188, 217, 113, 379, 486, 474, 475, 483, 484

[56] References Cited

U.S. PATENT DOCUMENTS

| | | | |
|---|---|---|---|
| 4,436,341 | 3/1984 | Converse | 297/250 |
| 4,533,176 | 8/1985 | Wyttenbach | 297/238 |
| 4,664,443 | 5/1987 | Casale | 297/408 X |
| 4,688,849 | 8/1987 | Tsuge et al. | 297/250 |
| 4,690,455 | 9/1987 | Bailey et al. | 297/238 |
| 4,936,627 | 6/1990 | Guim | 297/238 |
| 4,940,266 | 7/1990 | Sakamoto et al. | 297/379 X |
| 5,161,855 | 11/1992 | Harmon | 297/238 |

FOREIGN PATENT DOCUMENTS 3143957  5/1983  Fed. Rep. of Germany ...... 297/194
2023415  1/1980  United Kingdom ................ 297/238

*Primary Examiner*—Kenneth J. Dorner
*Assistant Examiner*—Milton Nelson, Jr.
*Attorney, Agent, or Firm*—Harness, Dickey & Pierce

[57] ABSTRACT

A seat assembly in which the seat back includes an integral child seat. The child seat is formed by a single panel rotatably mounted in the seat back and rotatable to a forward use position in which the top of the panel has a rear portion for seating of the buttocks of a child seat occupant thereon and a front portion forming a footrest for the child occupant. The child seat is deployed solely by rotating the panel from its stowed position within the seat back to the forwardly extending use position. The seat belt restraint system for the child seat includes a retractor mounted within the child seat panel. An optional rotating member can also be mounted in the front face of the panel forming a arm rest, cup holder or storage bin for use by adult occupants when the child seat is not deployed.

16 Claims, 3 Drawing Sheets

VEHICLE SEAT ASSEMBLY WITH INTEGRAL CHILD SEAT

BACKGROUND AND SUMMARY OF THE INVENTION

The present invention relates to a vehicle seat assembly with an integral child seat and in particular to such a seat assembly with features that provide for easier assembly as well as easier operation of the child seat than many integral child seats on the market today.

Integral child seat assemblies must necessarily include restraint systems for holding a child occupant therein. These restraint systems may or may not include a seat belt retractor. Those systems that do include a seat belt retractor typically mount the retractor directly to the vehicle floor pan resulting in an additional attachment point to the vehicle structure. This necessitates a modification to the vehicle structure to accommodate a seat back having the integral child seat option. The seat back of the present invention includes a retractor mounted to the seat back rather than to the vehicle. The seat back can use the same attachment points to the motor vehicle as a seat back not including an integral child seat. As a result, no modification to the vehicle structure is necessitated when the integral child seat option is selected.

In the preferred embodiment of the invention, the child seat belt retractor or retractors are mounted within the rotatable child seat cushion. This is preferred in that the packaging space provided in the child seat cushion for the retractor is greater than the space provided in the seat back portion of the child seat.

The child seat is comprised of a single rotating panel mounted at the base of the seat back and stored within a recess in the seat back. In the stored position, one face surface of the child seat panel forms an adult seat back surface. Deployment of the child seat is accomplished by rotating the child seat panel forward until the face surface of the child seat panel rests upon the seat cushion surface forward of the seat back. When the panel has been forwardly rotated, a recess in the seat back is revealed forming a child seat back surface rearward of the adult seat back surface of the seat back. By utilizing a single panel forming the child seat cushion, deployment is accomplished by one operation, rotation of one panel forward. The child seating surface of the child seat panel is provided with a rear portion upon which the buttocks of a child are seated and a forward portion forming a footrest for the child occupant. The footrest is preferably recessed relative to the rear seating surface.

In one embodiment of the invention, the child seat panel is provided with a secondary folding member which is rotatably mounted to the child seat panel and can be rotated from the front surface of the child seat panel. This folding member can be in the form of a storage bin, cup holder or an arm rest for use by adult seat occupants when the child seat panel is in its upright stowed position.

Further objects, features and advantages of the invention will become apparent from a consideration of the following description and the appended claims when taken in connection with the accompanying drawings.

DETAILED DESCRIPTION OF THE INVENTION

Figure 1:
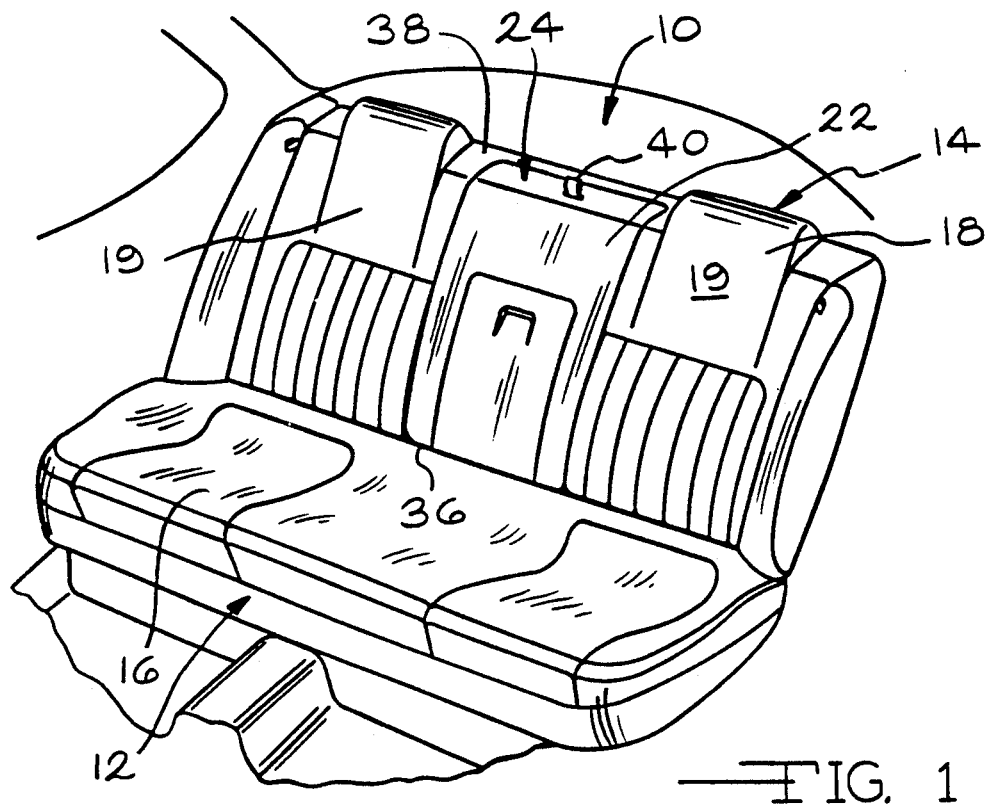
FIG. 1 perspective view of the seat assembly of the present invention showing the child seat panel in its stowed position.

The seat assembly of the present invention is shown in FIG. 1 and designated generally at 10. Seat assembly 10 includes a lower seat cushion 12 and a seat back 14 extending upwardly at the rear of the seat cushion 12. The seat cushion 12 has a top surface 16 which forms a seat cushion surface for an adult occupant of the seat assembly 10. Likewise, the seat back 14 includes a forward face surface 18 which forms a seat back surface for adult occupants of the seat assembly 10. The adult seat back surface is also formed in part by the face surface 22 of the child seat panel 24.

Child seat panel 24 is positioned in the center of the seat back 14 of the bench seat assembly 10 and is mounted for rotation about its lower end. Panel 24 is rotatable to the forwardly extending use position shown in FIG. 2. In the forwardly extending use position of the child seat panel 24, the panel is resting upon the seat cushion 12 with the face surface 22 of the panel engaging the seat cushion surface 16. In the use position, the opposite face surface of the child seat panel, top face surface 26 is revealed which forms a child seat cushion surface. The face surface 26 is referred to as a "top" face surface of the panel because, when the panel is in the use position, the surface 26 is the top surface of the panel. Likewise, the face surface 22 is referred to as a front face surface because, when the panel is in the stowed position within the seat back 14, the face surface 22 is a front surface of the panel. A removable pad is placed on the panel top surface for comfort and ease of cleaning.

When the panel 24 is rotated to the forward use position, a recess 30 is revealed in the seat back having a child seat back surface 32 that is recessed from the adult seat back surface 19. The adult seat back cushions to either side of the recess 30 function as side bolsters for the child seat. A removable seat back pad is placed in the recess for comfort and for ease of cleaning.

The child seat panel 24 extends the entire length from the lower end 36 of the seat back to the upper end 38. Deployment of the child seat is accomplished solely by rotation of the panel 24 from its upright stowed position to the forwardly extended use position. A pull tab 40 is provided at the top end of the child seat panel for ease in grasping the panel 24. Once the panel has been rotated to the forward use position, the child seat is ready for use. The single movable panel results in an easy to use child seat.

The child seat panel is held in its stowed position by friction between the panel and the surrounding seat back cushions. If additional latching is necessary strikers 42 can be provided at the upper corners of the panel for insertion into openings 44 in the child seat back surface. Latch mechanisms (not shown) in the seat back grasp the strikers to hold the child seat panel in the upright stowed position.

Figure 2:
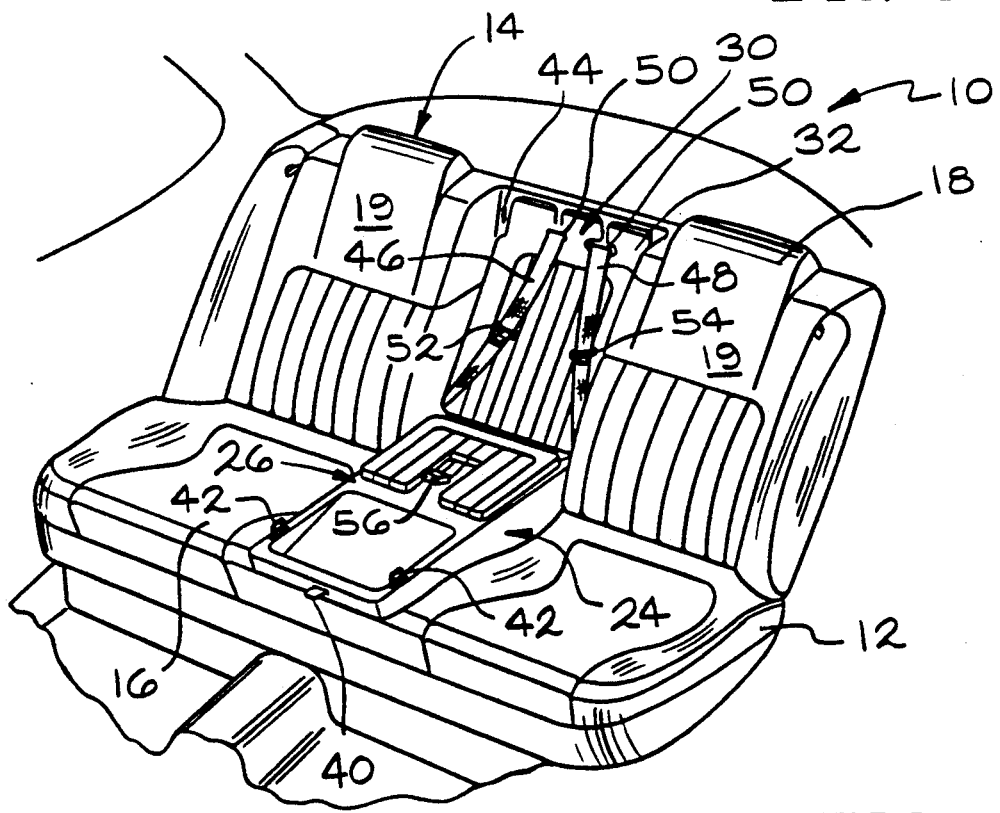
FIG. 2 is a perspective view of the seat assembly of the present invention showing the child seat panel in a forwardly rotated deployed position.

When the child seat is deployed as shown in FIG. 2, a restraint system for a child seat occupant is revealed. The restraint system includes a pair of shoulder belts 46 and 48 extending upwardly from the lower corners of the recess 30 to openings 50 in the child seat back surface 32. The shoulder belts 46 and 48 include sliding clasps 52 and 54 respectively which are each insertable into a seat belt buckle 56 mounted to the child seat panel 24 between the legs of a child occupant, forming a five point restraint for a child occupant.

Figure 3:
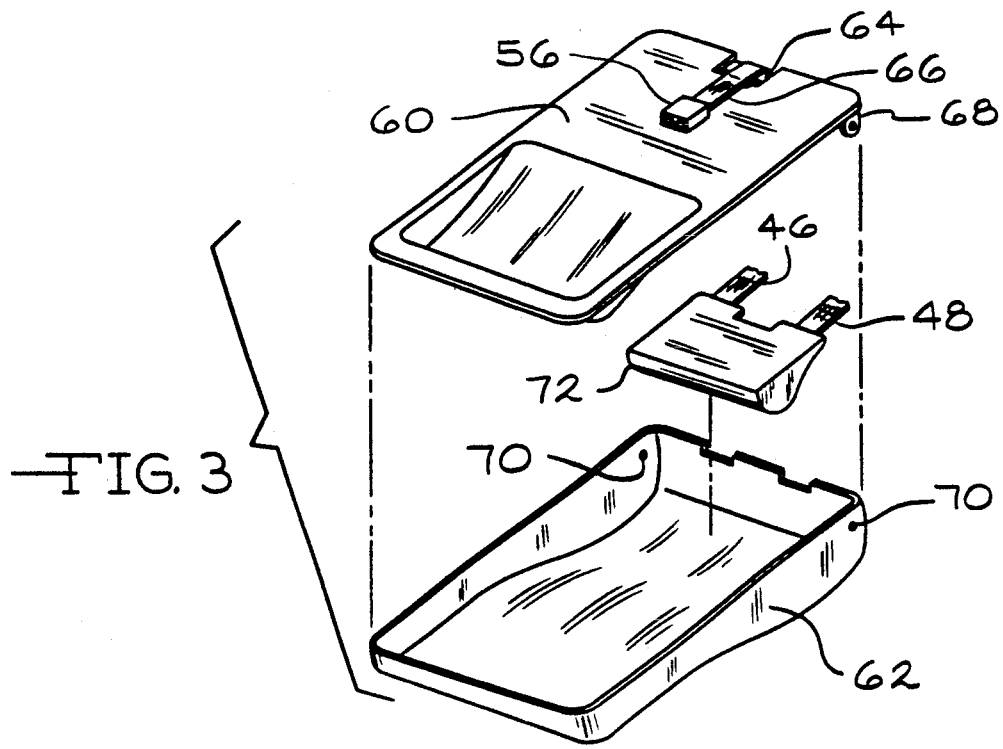
FIG. 3 is an exploded perspective view of the child seat panel of the present invention.

The child seat panel 24 is shown in greater detail in the exploded view in FIG. 3. The panel includes a housing comprised of a base 60 which forms the panel top surface 26 and a contoured cover 62 which forms the upholstered front face surface 22. The base 26 has a support bar 64 at its lower end to which the seat belt buckle 56 is attached by a seat belt strap 66. The lateral ends of the support bar 64 form mounting bosses 68 for rotatably mounting the panel 24 to the seat back frame (not shown) at the pivot point 70.

The shoulder belts 46 and 48, after entering into the seat back through the openings 50, extend downwardly through the seat back and then forwardly into the panel 24 at its lower end. A seat belt retractor 72 is disposed within the panel 24 having two retractor mechanisms therein. One end of each shoulder belt 46 and 48 is wound upon the retractor. The seat back 10, by including the retractor 72 as part of the seat back, forms a complete module that can be installed in a motor vehicle in the same manner as a seat back not incorporating an integral child seat. The only modification that may be necessary is reinforcement of the seat back attaching hardware which must now be capable of transferring the restraint system loads of the child seat assembly from the seat back to the motor vehicle structure. However, due to the size of a child seat occupant as compared to an adult, the fastener strength will not need to be the same as used for an adult seat belt anchor.

An advantage of the modular concept of the seat back is that it eliminates the requirement for a separate seat belt anchor to attach the retractor to the vehicle. A disadvantage of the modular concept for the seat back is that the frame structure of the seat back must be a structural seat back, capable of accommodating the restraint loads from the child seat rather than having those loads transferred directly to the vehicle structure by an additional seat belt anchor. The modularity of the seat back results from the child seat restraint system being mounted to the seat back. The retractor 72 is mounted within the panel 24 due to packaging constraints. More space is available in the panel then in the seat back behind the panel for packaging the retractor.

A three point restraint system can also be used. In such a system, the two shoulder belts would be joined to a common clasp at their lower ends for insertion into the seat back. A cinch strap would be connected to the other ends of the belts and held by a pawl in the seat panel 24. With such a system, a seat belt retractor would not be needed.

Figure 4:
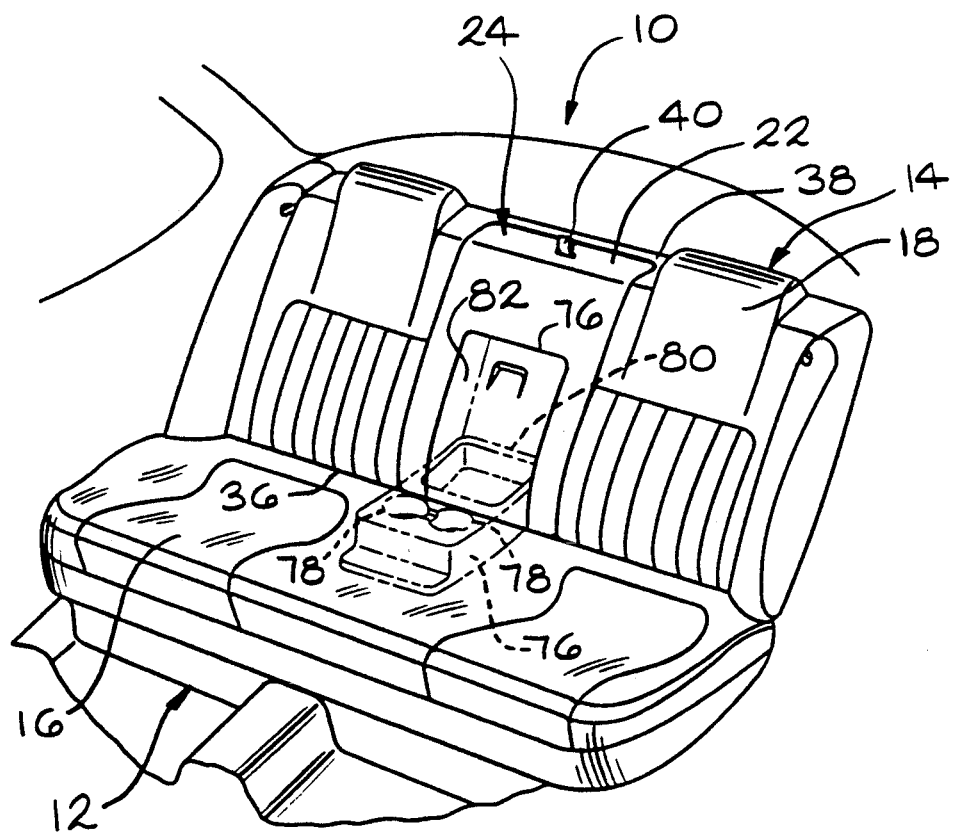
FIG. 4 is a perspective view of the seat back of the present invention with the child seat panel in the stowed position and with a secondary rotating member within the child seat panel rotated forward to a deployed position.

In FIG. 4, an alternative embodiment of the seat back 14 as shown in which, the child seat panel 24 includes an additional feature, a rotating member 76. Member 76 is rotatably mounted within the panel 24 at its lower end in a similar manner to the way in which the panel 24 is rotatably mounted into the seat back 14. Rotating member 76 is shown in solid line in its stowed upright position and in phantom line in a forwardly rotated use position. The member 76 can serve as a arm rest for adult seat occupants on either side of the member 76. In addition, the member 76 can be configured with a pair of openings 78 for holding a beverage container and can also be configured with a bin 80 for storage of small items such as maps, sun glasses, etc. The front face 82 of the rotating member 76 forms a portion of the front face surface 22 of the child seat panel 24.

Figure 5:
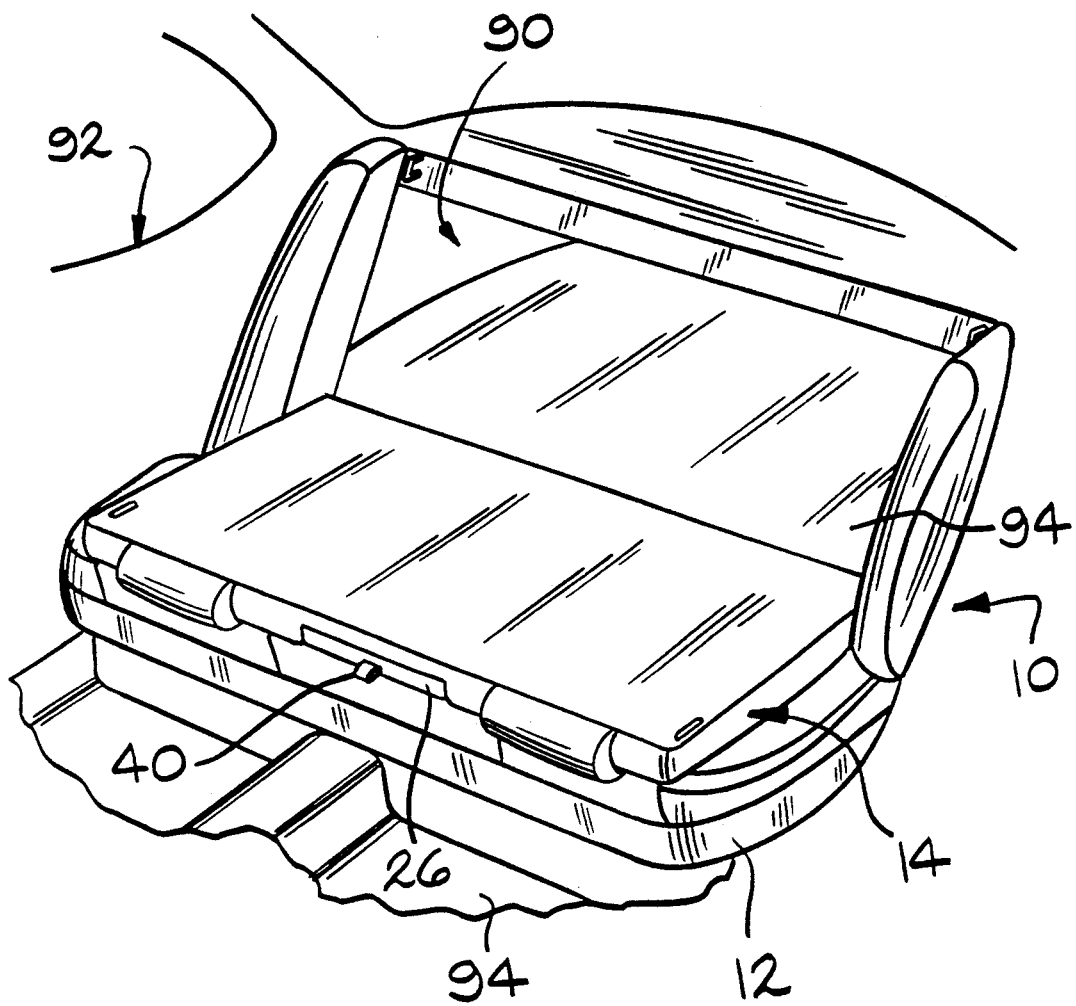
FIG. 5 is a perspective view of the seat back rotated forward to a stowed position providing access to the storage space behind the seat assembly.

With reference to FIG. 5, a further advantage of mounting the seat belt system entirely within the seat back is shown. In FIG. 5, the seat back 14 is rotatably mounted so that it can be rotated to a forward stowed position on top of the seat cushion. In this position, access is provided to the storage area 90 behind the seat assembly increasing the total volume of the vehicle 92 storage space. By mounting the child seat restraining belts within the seat back, there are no belts exposed along the back side of the seat back 14 extending into a retractor or seat belt anchor mounted to the vehicle floor pan 94. The result is a cleaner package for the seat back with no exposed belts to interfere with storage and removal of items behind the seat back or upon the seat back when rotated forward. This is in contrast to a seat assembly in which the child seat restraints are attached directly to the vehicle. In that case, the belts and the belt anchors will be visible and perhaps be an obstruction when the seat back is rotated forward.

The seat assembly of the present invention, including an integral child seat, contains several features which improve the ease of assembly of the seat and ease of use of the child seat. By mounting the seat belt restraint to the seat back, preferably to the child seat panel, the seat back with the integral child seat can be installed in a vehicle in the same manner as a conventional seat back. The single rotating panel allows for simplicity in deploying the child seat. Only one operation is needed. Furthermore, the child seat panel can include an optional rotating member forming an arm rest, cup holder and/or storage bin for use when the child seat is not in use.

It is to be understood that the invention is not limited to the exact construction illustrated and described above, but that various changes and modifications may be made without departing from the spirit and scope of the invention as defined in the following claims.

I claim:

1. A seat assembly for a motor vehicle comprising:
   a lower seat cushion having a horizontal adult seating surface and a rear end;
   a seat back extending upwardly at the rear end of said cushion having upper and lower ends and a front face forming an adult seat back surface, said seat back further having a recessed portion forming a child seat back surface rearward of said adult seat back surface;
   a panel with first and second opposite faces mounted for rotation about a first lateral axis at the lower end of said seat back, said panel having a first position disposed in said recessed portion in which said first face of said panel is generally flush with said adult seat back surface and forms a continuation thereof over said recessed portion;

said panel being rotatable to a second forwardly extending use position in which said child seat back surface is revealed, and said second face of said panel forms a top surface upon which a child can be seated; and restraint means for restraining a child seat occupant seated upon said panel, said restraint means including a seat belt retractor mounted to said seat back and a seat belt strap having a first end wound upon said retractor and forming a shoulder belt for the child seat occupant.

2. The seat assembly of claim 1 wherein said panel top surface has a rear portion upon which the buttocks of a child occupant are rested and a front portion forming a foot rest for the child occupant with said recessed portion of said seat back extending upwardly a sufficient distance from said panel when said panel is in said second position for the torso and head of the child occupant to rest within said recessed portion whereby said seat assembly can be used by an adult when said panel is in said first position and said seat assembly can be converted for use by a child solely by rotation of said panel about said axis to said second position revealing said panel second face and said child seat back surface.

3. The seat assembly of claim 1 wherein said retractor is mounted within said panel mounted to said seat back.

4. The assembly of claim 3 wherein:

said restraint means includes a pair of straps each having first ends wound upon said retractor, said straps each forming shoulder straps for the child occupant seated upon said panel; and means for releasably attaching said straps to said panel between the legs of the child occupant to restrain the child occupant.

5. The seat assembly of claim 3 wherein:

said straps extend from said retractor upwardly behind said child seat back surface toward the upper end of said seat back after which said straps project forward through said child seat back surface and extend downwardly to opposite sides of said recessed portion where second ends of said straps are anchored to said seat back; and wherein said attaching means includes a pair of sliding clasps, one of said pair can each of said straps, and a buckle attached to said panel between the legs of the child occupant for reception of said clasps therein to form a five point restraint for the child occupant.

6. The seat assembly of claim 1 further comprising a rotating member in said panel forming a portion of the first face of said panel, said member being rotatably mounted to said panel for rotation about a second lateral axis and said member having a stowed position within said panel and said member being rotatable to a forwardly extending use position when said panel is stowed in the recessed portion of the seat back.

7. The seat assembly of claim 6 wherein said member, in the use position thereof, serves as an arm rest for a seat occupant positioned adjacent said member.

8. The seat assembly of claim 6 wherein said member, in the use position thereof, has an upper surface with at least one recess therein for holding a beverage container for a seat occupant positioned adjacent said member.

9. The seat assembly of claim 6 wherein said member includes a storage compartment.

10. A seat assembly for a motor vehicle comprising:

a lower seat cushion having a horizontal adult seating surface and a rear end;

a seat back extending upwardly at the rear end of said cushion having a front face forming an adult seat back surface, said seat back having a lower end and an upper end, said seat back further having a recessed portion forming a child seat back surface rearward of said adult seat back surface; and a panel with first and second opposite faces mounted for rotation about a lateral axis at the lower end of said seat back, said panel having a first position disposed in said recessed portion in which said first face is generally flush with said adult seat back surface and forms a continuation thereof over said recessed portion;

said panel being rotatable to a second forwardly extending position in which said child seat back surface is revealed, and said second face of said panel forms a top surface, said top surface having a rear portion for seating the buttocks of a child thereon with the torso of the child resting upon said child seat back surface, said top surface further having a front portion forming a foot rest for the child, whereby said seat assembly can be used by an adult when said panel is in said first position and said seat assembly can be converted for use by a child solely by rotation of said panel about said axis to said second position revealing said panel second face and said child seat back surface and;

restraint means for restraining a child seat occupant seated upon said panel, said restraint means including a seat belt retractor mounted to said seat back and a restraining belt strap having a first end wound upon said retractor and forming a shoulder belt for the child seat occupant.

11. The seat assembly of claim 10 wherein said panel, when in said first position, extends from the lower end of said seat back to the upper end of said seat back.

12. The seat assembly of claim 10 wherein said foot rest of said panel second face has a surface recessed from a surface of said rear portion.

13. A seat assembly for a motor vehicle comprising:

a lower seat cushion having a horizontal adult seating surface and rear end;

a seat back extending upwardly at the rear end of said cushion having upper and lower ends and a front face forming an adult seat back surface, said seat back further having a recessed portion forming a child seat back surface rearward of said adult seat back surface;

a panel with first and second opposite faces mounted for rotation about a first lateral axis at the lower end of said seat back, said panel having a first position disposed in said recessed portion in which said first face of said panel is generally flush with said adult seat back surface and forms a continuation thereof over said recessed portion;

said panel being forwardly rotatable to a second position in which said first face of said panel engages said lower seat cushion and is supported upon said lower seat cushion and said child seat back surface is revealed, and said second face of said panel forms a top surface upon which a child can be seated; and a rotating member in said panel forming a portion of the first face of said panel, said member being rotatably mounted to said panel for rotation about a second lateral axis and said member having a stowed position within said panel and being rotatable to a forwardly extending use position when said panel is stowed in the recessed portion of the seat back.

14. The seat assembly of claim 13 wherein said member, in the use position thereof, serves as an arm rest for a seat occupant positioned adjacent said member.

15. The seat assembly of claim 13 wherein said member, in the use position thereof, has an upper surface with at least one recess therein for holding a beverage container for a seat occupant positioned adjacent said member.

16. The seat assembly of claim 13 wherein said member includes a storage compartment.

* * * * *

UNITED STATES PATENT AND TRADEMARK OFFICE
CERTIFICATE OF CORRECTION

PATENT NO.   : 5,286,084
DATED        : February 15, 1994
INVENTOR(S)  : Kurt A. Bart It is certified that error appears in the above-indentified patent and that said Letters Patent is hereby corrected as shown below:

In Column 5, line 46, Claim 5, delete "can" and insert in place thereof --on--.

In Column 2, line 3, after "Fig. 1" insert --is a --.

Signed and Sealed this

Twenty-sixth Day of July, 1994

Attest:

BRUCE LEHMAN

Attesting Officer        Commissioner of Patents and Trademarks